United States Patent Office 3,097,227
Patented July 9, 1963

3,097,227
4-(1,2-DICYANOVINYL) DIARYLDICYANO METHANES, AND PREPARATION THEREOF
John K. Williams, Wilmington, Del., assignor to E. I. du Pont de Nemours and Company, Wilmington, Del., a corporation of Delaware
No Drawing. Filed Apr. 28, 1960, Ser. No. 25,185
7 Claims. (Cl. 260—465)

This invention is concerned with a new class of acidic organic compounds, their salts which are useful as dyes, and a process for their preparation.

In photography it is customary to limit the spreading of light in a focused image beyond its proper boundaries by incorporating some antihalation means into the photographic film. To obtain full benefit of the antihalation effect, it is essential that the antihalation means be active when the image is focused on the film and that it be removable during subsequent film processing. This has been accomplished in numerous ways. For example, a light-absorbing antihalation layer has been applied as a strippable coating on the photographic film. After serving its purpose during exposure of the film, this layer is mechanically removed during processing. In a preferred method, a layer of gelatin containing an antihalation dye is incorporated as part of the film. The dye retains its light absorption characteristics during exposure of the film but is so constituted chemically that its color is destroyed (i.e., discharged) on contact with either alkali, as in the photographic developer, or acid, as in the stop bath or acid-fixing bath, during processing. The dyes of this invention are highly colored compounds which are decomposed to colorless products on contact with alkali, as in a photographic developer. They are consequently useful as antihalation dyes.

It is an object of this invention to provide a new class of acidic organic compounds and a process for their preparation. A further object is to provide a new class of acidic organic compounds and their salts which are useful as dyes, and a process for their preparation. Other objects will appear hereinafter.

These and other objects of this invention are obtained by providing the 4-(1,2-dicyanovinyl)aryldicyanomethanes and the corresponding 4-(1,2-dicyanovinyl)aryldicyanomethanide salts and a process for their preparation by the reaction of 1,4-bis(dicyanomethylene)cyclohexadiene with a monosubstituted acetonitrile in which the indicated substituent is a monovalent radical with its bond stemming from a carbon atom which also carries a multiple bond to oxygen, sulfur, nitrogen or another carbon atom.

The compounds of this invention may be generically expressed by the formulas

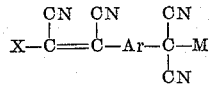

or

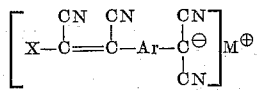

where Ar is a 1,4-arylene radical, X is a monovalent radical with its bond stemming from a carbon atom which in turn is multiple bonded to oxygen, sulfur, nitrogen or another carbon atom, and M is a cation, including hydrogen.

Preferred groups for X include —CN,

and p—Q—C$_6$H$_4$—, where Z is —R, —Y'R, —NH$_2$, —NHR, or —NRR'; Q is —NO$_2$, RSO$_2$—, or —CN; Y and Y' are chalcogens of atomic number less than 17; R and R' are hydrocarbyl free of aliphatic carbon-to-carbon unsaturation; and M is a cation. It is understood that in a given compound the several embodiments of R and R', and Y and Y' that may be involved may be the same or different, respectively.

By hydrocarbyl group is meant a monovalent hydrocarbon radical, i.e., a radical composed only of carbon and hydrogen. The structure of the hydrocarbyl groups is not a point of novelty in this invention. Thus, they may be aliphatic, as methyl, butyl, octyl, stearyl, eicosyl, etc., cycloaliphatic as cyclopropyl, cyclohexyl, etc.; aryl as phenyl, anthryl, etc.; and combinations of these. The total number of carbons is not critical, but preferably, the total number of carbons in any hydrocarbyl group is not over 20.

The preferred cations are hydrogen, ammonium, sulfonium and the ions of the metals. The preferred arylene radicals are the 1,4-carbocyclic arylene radicals containing only carbon and hydrogen, such as 1,4-phenylene, 1,4-naphthylene, 1,4-anthrylene, 9,10-anthrylene, and the like.

In naming the compounds of this invention, the anions obtained by removing a proton from each of the respective acidic products are referred to as the 4-(1,2-dicyanovinyl)aryldicyanomethanide ions. One skilled in the art will recognize that the formula

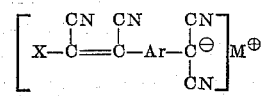

where X, Ar and M are as previously defined, presents only one of several resonance forms contributing to the structure of the anion. In the several resonance forms, the charge of the ion may be visualized as associated with various atoms in the ion. The names indicated are considered to cover these ions regardless of which resonance form may contribute the most to the structure of the anion.

The process for the preparation of the products of this invention in which the aryl moiety of the aryldicyanomethane is phenyl is exemplified by the following equation:

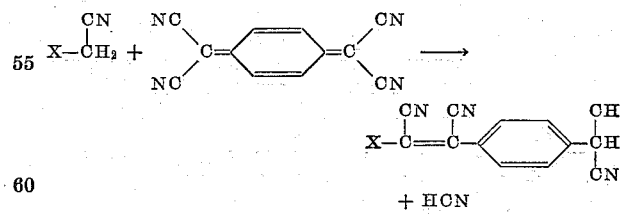

+ HCN where X is as defined earlier.

The process of this invention may be carried out by simply bringing the reactants into intimate contact. No added catalysts, reaction media, or special reaction conditions other than a pH above 7 are essential. It is obvious from the above equation that reaction takes place between equimolecular proportions of the substituted-acetonitrile and 1,4-bis(dicyanomethylene)cyclohexadiene, i.e., alpha,alpha,alpha'alpha'-tetracyanoquinodimethane, but this in no way limits the proportions in which they may be brought together to carry out the reaction. For example, molar ratios of from 19:1 to 1:19 may be employed, although highest yields are obtained when approximately stoichiometric amounts of the reactants are used.

The use of a reaction medium which is inert to the reactants and products of this invention is preferred since this provides a convenient means for controlling and dissipating the heat of reaction.

The reaction is preferably carried out under alkaline conditions at a pH above 7 and in the substantial absence of water. This does not mean that traces of water make the process inoperable. However, under the alkaline conditions necessary for the reaction, any water present may hydrolyze part of the product, thereby decreasing the product yield. In any event, the amount of water present during the reaction must be less than the stoichiometric amount required for hydrolysis of the product.

Reaction temperatures in the range of 0° to 160° C. are preferred for this reaction, but temperatures both below and above this range are operable up to the decomposition temperature of the reactants or products, whichever is lower. Pressures above and below atmospheric pressure are operable, and atmospheric pressure is preferred for reasons of economy.

In a preferred embodiment of this invention, a substituted acetonitrile and a 1,4-bis(dicyanomethylene)-cyclohexadiene are dissolved in an inert medium such as dimethylformamide and heated at reflux for several hours. The 4-(1,2-dicyano-2-substituted-vinyl)phenyldicyanomethane is separated from the resulting solution by chromatography and recovered by evaporation of the chromatographing solvent.

An alternative process may be used when X is —CN:

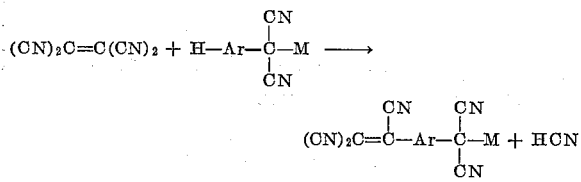

where Ar is arylene and M is a cation, including hydrogen.

The single hydrogen on the dicyanomethane group in a 4-(1,2-dicyano-2-substitutedvinyl)aryldicyanomethane is strongly acidic in the conventional sense of being highly ionized in aqueous solutions. It is readily replaced by salt-forming cations to form the corresponding salts. In the process of this invention, it is possible to treat the reaction product from 1,4-bis(dicyanomethylene)cyanohexadiene and a monosubstituted acetontrile with an acidic ion-exchange resin to obtain the free acid form of the 4-(1,2-dicyano-2-substitutedvinyl)aryldicyanomethane. If on the other hand, the reaction is carried out in the presence of an equivalent amount of a base or other suitable source of a salft-forming cation, or if the free acid is mixed with an equivalent amount of such a base or source of a salt-forming cation, the corresponding 4-(1,2-dicyano-2-substitutedvinyl)aryldicyanomethanide salt is formed.

The process and products of this invention are illustrated in the following examples in which parts are by weight unless otherwise indicated.

EXAMPLE I

Part A

A mixture of 140 parts of malononitrile, 112 parts of of 1,4-cyclohexanedione, 63 parts of acetic acid, and 20 parts of ammonium acetate in 1,760 parts of benzene is heated under reflux using a water separator for about two hours or until the theoretical amount of water has been removed. The reaction mixture is cooled and the solid product which precipitates is collected by filtration and washed well with water. Recrystallization from ethyl acetate gives 159 parts (76.5% yield) of 1,4-bis(dicyanomethylene)cyclohexane, M.P. 197–212° C.

Part B

A solution of 76.5 parts of 1,4-bis(dicyanomethylene)-cyclohexane in 1,174 parts of acetonitrile is heated at 50° C. under a nitrogen atmosphere while 160 parts of N-bromosuccinimide is added in small portions over a 45-minute period. The reaction mixture is stirred at the same temperature for an addiitonal 45 minutes. It is then chilled to −20° C. and a solution of 72 parts of pyridine in 714 parts of ether is added. After stirring at −15° to −20° C. for an additional 15 minutes, the reaction mixture is allowed to warm to room temperature. Cold water is added and the precipitate which forms is collected by filtration and recrystallized from ethyl acetate to give 64.1 parts (84% yield) of rust-colored crystals of 1,4-bis(dicyanomethylene)cyclohexadiene, M.P. 289–291° C. (dec.).

Part C

A mixture of 30 parts of 1,4-bis(dicyanomethylene)-cyclohexadine, 15 parts of malononitrile, and 473 parts of dimethylformamide is heated at 80–100° C. for one-half hour. The resulting deep blue reaction mixture, containing (4-tricyanovinylphenyl)dicyanomethane, is poured into 5,000 parts of cold water. To this solution is added 250 parts of tetramethylammonium chloride. A microcrystalline black precipitate forms immediately and is collected by filtration. This is recrystallized from 1,970 parts of absolute ethanol to yield 42 parts of tetramethylammonium (4-tricyanovinylphenyl)dicyanomethanide in the form of brilliant dark blue needles. These are recrystallized first from ethanol and then from acetonitrile to yield a purified product melting at 237–238° C. The ultraviolet absorption spectrum of this material in ethanol shows maxima at 625, 350, and 292 millimicrons with molecular extinction coefficients of 52,200, 5,590, and 7,740 respectively. The infrared spectrum shows bands at 3.28, 3.37, 4.51, 4.55, 4.62, 6.20, 6.57, 6.73, 6.88, 7.28, 7.38, 10.53, and 12.07 microns.

Analysis.—Calcd. for $C_{18}H_{16}N_6$: C, 68.33; H, 5.10; N, 26.56. Found: C, 68.30; H, 5.09; N, 26.97.

EXAMPLE II

A mixture of 240 parts of p-nitrophenylacetonitrile, 208 parts of 1,4-bis(dicyanomethylene)cyclohexadiene, and 1890 parts of dimethylformamide is heated under reflux for 3.0 hours. The deep grey-blue solution is diluted with about 6270 parts of acetonitrile. Spectral measurement of a 1% by volume aliquot of this solution indicates a 20% yield of 4-(1,2-dicyano-2-[p-nitrophenyl]vinyl)phenyldicyanomethane.

The remaining 99% of the acetonitrile solution is chromatographed on 10,000 parts of acidic activated alumina. Elution with acetonitrile gives a deep brown eluate followed by deep blue. The blue eluate is reduced to dryness at 60° C. The dark blue residue of 4-(1,2-dicyano-2-[p-nitrophenyl]vinyl)phenyldicyanomethane is dissolved in 50,000 parts of hot water and the resulting solution is filtered through diatomaceous earth. To the hot filtrate is added 5000 parts of tetramethylammonium chloride which causes tetramethylammonium 4-(1,2-dicyano-2-[p-nitrophenyl]vinyl)phenyldicyanomethanide to precipitate. After one recrystallization from ethanol and a second from absolute ethanol, the product melts at 196–197° C. The infrared spectrum shows bands at 4.53 and 4.58 microns (conj. —CN). The ultraviolet-visible spectrum in ethanol shows a peak at 618 millimicrons (molecular extinction coefficient 44,800), a shoulder at 320 millimicrons (molecular extinction coefficient 9,200), and a peak at 292 millimicrons (molecular extinction coefficient 11,600).

*Analysis.*—Calcd. for $C_{23}H_{20}N_6O_2$: C, 66.98; H, 4.89. Found: C, 66.41; H, 4.64.

EXAMPLE III

A mixture of 200 parts of ethyl cyanoacetate, 208 parts of 1,4-bis(dicyanomethylene)cyclohexadiene, and 1890 parts of dimethylformamide is heated under reflux for 2.5 hours. The deep blue solution is diluted with about 6270 parts of acetonitrile. Measurement of the spectrum of a 1% by volume aliquot of this solution (diluted with ethanol) indicates a 36% yield of 4-(1,2-dicyano-2-ethoxycarbonylvinyl)phenyldicyanomethane.

The remaining 99% of the acetonitrile solution is chromatographed on 10,000 parts of acidic activated alumina using acetonitrile as the eluting solvent. The portion of the eluate that is blue is evaporated to dryness. The very dark blue residue of 4-(1,2-dicyano-2-ethoxycarbonylvinyl)phenyldicyanomethane is dissolved in 20,000 parts of hot water, treated with activated carbon, and filtered. When 3000 parts of tetramethylammonium chloride is added to the aqueous solution, tetramethylammonium 4 - (1,2 - dicyano - 2 - ethoxycarbonylvinyl) phenyldicyanomethanide precipitates. After two crystallizations from absolute ethanol, deep green needles are obtained, M.P. 175–176° C. The infrared spectrum shows bands at 4.55 and 4.62 microns (conj. —CN) and 5.78 microns (conj. ester C=O). The ultraviolet visible spectrum shows a peak at 616 millimicrons (molecular extinction coefficient 45,000), a shoulder at 233 millimicrons (molecular extinction coefficient 6,280) and a peak at 290 millimicrons (molecular extinction coefficient 10,500).

*Analysis.*—Calcd. for $C_{20}H_{21}N_5O_2$: C, 66.10; H, 5.83. Found: C, 66.05; H, 6.01.

EXAMPLE IV

A solution is prepared by mixing 710 parts of phenylmalononitrile, 640 parts of tetracyanoethylene, and 1417 parts of dimethylformamide. The solution is dark green when formed. Within three minutes it has warmed spontaneously and is brought to 0° C. by external cooling. After a total time of ten minutes a by-product precipitate is removed by filtration and discarded. The filtrate (*a*) is allowed to stand at room temperature for about 18 hours, by which time it has turned deep blue in color. A portion of this solution is mixed with about an equal volume of water to precipitate a gummy product. This is dissolved in acetonitrile and chromatographed on acidic activated alumina. The blue portion of the elute is rechromatographed in acetonitrile on acidic activated alumina. A heart cut of the eluate is evaporated to dryness to yield 1.04 part of a crystalline solid containing the ammonium salt of (4-tricyanovinylphenyl)dicyanomethane. This is dissolved in 783 parts of acetonitrile. The resulting blue solution shows an absorption maximum in the range of 620–650 millimicrons with an absorbance of 168. The remaining portion of the filtrate (*a*) is added to 7928 parts of methanol and 2000 parts of 10% aqueous silver nitrate solution is added. The dark brown precipitate which forms is collected by filtration, washed successively with methanol and water, and then dried to yield 90 parts of silver (4-tricyanovinylphenyl)dicyanomethanide. This salt yields a blue solution when dissolved in acetonitrile.

EXAMPLE V

To a suspension of 48 parts of sodium hydride (96 parts of 50% dispersion in hydrocarbon oil) in 2,220 parts of tetrahydrofuran is added a solution of 284 parts of phenylmalononitrile in 1,770 parts of tetrahydrofuran during the course of one-half hour. The resulting solution of sodiophenylmalononitrile is cooled to 0° C. and a solution of 256 parts of tetracyanoethylene in 1,770 parts of tetrahydrofuran is added during one-half hour. The resulting deep green-yellow solution is stirred at 0–10° C. for two hours. A deep violet solid by-product is removed by filtration. The remaining liquid is stored at 25° C. for 26 days, during which time it becomes deep blue-green in color. The solvent is removed by evaporation and the remaining dark oil, containing sodium (4-tricyanovinylphenyl)dicyanomethanide, is extracted with 7,500 parts of boiling water. The hot extract is filtered through diatomaceous earth and to the filtrate is added 300 parts of tetramethylammonium chloride. The resulting precipitate is collected by filtration and recrystallized by dissolving in 1,2-dimethoxyethane, followed by addition of an equal volume of ether, to yield 29 parts of crude tetramethylammonium (4-tricyanovinylphenyl)dicyanomethanide in the form of green microcrystalline needles.

EXAMPLE VI (4-tricyanovinylphenyl)dicyanomethane is prepared by passing an aqueous solution of tetramethylammonium (4-tricyanovinylphenyl)dicyanomethanide over an acid ion exchange resin (Amberlite 120). A portion of this solution containing 6 parts of (4-tricyanovinylphenyl) dicyanomethane is diluted with water to a total of 50,000 parts and 1500 parts of photographic gelatin is added. The gelatin is dissolved by heating at about 80° C. for a few minutes. The resulting solution is cooled and coated on a cellulose acetate photographic film base to yield, when dry, a blue antihalation coating 0.6 mil thick having an optical density of 1.06 at 620 millimicrons. A strip of this film is treated with a conventional aqueous lithographic film developer at pH 9.48 for 5 minutes. The blue color of the (4-tricyanovinylphenyl)dicyanomethane is substantially completely discharged. The film is then rinsed in water and treated for 5 minutes in a conventional aqueous photographic acid fixer (containing 14% sodium thiosulfate as the principal ingredient) at pH 4.3. There is no return of the color.

Example VI is repeated using tetramethylammonium (4-tricyanovinylphenyl)dicyanomethanide in place of (4-tricyanovinylphenyl)dicyanomethane. A blue gelatin solution suitable for preparing an antihalation layer is obtained.

When the procedure of Example II is repeated using the indicated monosubstituted acetonitriles in place of p-nitrophenylacetonitrile, the indicated 4-(1,2-dicyano-2-substitutedvinyl)phenyldicyanomethanides are obtained:

| Monosubstituted acetonitrile | 4-(1,2-dicyano-2-substituted-vinyl) phenyldicyanomethanide product |
| --- | --- |
| Acetoacetonitrile | Tetramethylammonium 4-(2-acetyl-1,2-dicyanovinyl)phenyldicyanomethanide. |
| Alpha-cyanoacetamide | Tetramethylammonium 4-(2-carbamoyl-1,2-dicyanovinyl) phenyldicyanomethanide. |
| Alpha-cyano-N-ethyl-acetamide | Tetramethylammonium 4-(1,2-dicyano-2-N-ethylcarbamoylvinyl)phenyldicyanomethanide. |
| p-Cyanophenylacetonitrile | Tetramethylammonium 4-(2-[p-cyanophenyl]-1,2-dicyanovinyl-phenyldicyanomethanide. |
| Alpha-cyanothioacetamide | Tetramethylammonium 4-(2-thiocarbamoyl-1,2-dicyanovinyl)-phenyldicyanomethanide. |

EXAMPLES VII–XXII

An aqueous solution of (4-tricyanovinylphenyl)-dicyanomethane is prepared by agitating together 50 parts of tetramethylammonium (p-tricyanovinylphenyl) dicyanomethanide, 500 parts of water, and 500 parts of an acidic anion exchange resin (Amberlite IR 120, H form) for 1½ hours at room temperature. The resulting deep blue aqueous solution of (4-tricyanovinylphenyl)

dicyanomethane is separated by filtration. Saturated aqueous solutions (except where indicated by asterisks) of the inorganic salts shown in the examples below are mixed in the ratio of about 20 volumes of saturated salt solution to one volume of the (4-tricyanovinylphenyl) dicyanomethane solution. The (4-tricyanovinylphenyl) dicyanomethanide salt which forms is indicated along with its solubility in the mixture. Each mixture is then diluted with about 60 volumes of water and any change in solubility of the (4-tricyanovinylphenyl)dicyanomethanide salt is shown.

| Example | (Aqueous solution) | Resulting (4-tricyanovinylphenyl) dicyanomethanide | | |
|---|---|---|---|---|
| | | Salt obtained | Concentrated solution | Diluted solution |
| VII | Barium chloride | Ba++ | Slightly sol. | Sol. |
| VIII | Cadmium chloride | Cd++ | Insol. | Sol. |
| IX | Calcium chloride [1] | Ca++ | Sol. | Sol. |
| X | Cuprous chloride | Cu+ | Insol. | Insol. |
| XI | Cuprous nitrate | Cu+ | Insol. | Insol. |
| XII | Cupric chloride | Cu++ | Insol. | Insol. |
| XIII | Ferrous ammonium sulfate. | Fe++ | Insol. | Insol. |
| XIV | Ferric chloride | Fe+++ | Insol. | Insol. |
| XV | Lead chloride | Pb++ | Sol. | Sol. |
| XVI | Lithium chloride | Li+ | Partly sol. | Sol. |
| XVII | Magnesium chloride. | Mg++ | Sol. | Sol. |
| XVIII | Nickel chloride | Ni++ | Insol. | Insol. |
| XIX | Potassium chloride | K+ | Partly sol. | Sol. |
| XX | Silver nitrate | Ag+ | Insol. | Insol. |
| XXI | Sodium chloride | Na+ | Slightly sol. | Sol. |
| XXII | Zinc chloride [1] | Zn++ | Partly sol. | Sol. |

[1] 20% solution.

In the examples above, soluble means no precipitate and deep blue solution; slightly soluble means precipitate plus light blue solution; partly soluble means precipitate plus deep blue solution; and insoluble means precipitate plus colorless solution.

The free acid products of this invention, i.e., the 4-(1,2-dicyano-2-substitutedvinyl)aryldicyanomethanes, as illustrated by (4 - tricyanovinylphenyl)dicyanomethane in Examples I and VI, 4-(1,2-dicyano-2-[p-nitrophenyl]-vinyl)phenyldicyanomethane in Example II, and 4-(1,2-dicyano-2-ethoxycarbonylvinyl)phenyldicyanomethane in Example III readily yield the corresponding salts on reaction with oxides or hydroxides. Thus when aqueous solutions of these free acids react with lithium hydroxide, potassium hydroxide, rubidium hydroxide, cesium hydroxide, magnesium hydroxide, calcium hydroxide, barium hydroxide, triphenylsulfonium hydroxide, aluminum oxide, cuprous oxide, cupric oxide, zinc oxide, ferric oxide, mercurous oxide, mercuric oxide, lead oxide, etc., the corresponding lithium, potassium, rubidium, cesium, magnesium, calcium, barium, triphenylsulfonium, aluminum, cuprous, cupric, zinc, ferric, mercurous, mercuric, and lead, (4-tricyanovinylphenyl)dicyanomethanides, 4-(1,2-dicyano - 2 - [p - nitrophenyl]vinyl)phenyldicyanomethanides, and 4-(1,2 - dicyano-2-ethoxycarbonylvinyl) phenyldicyanomethanides are formed and are isolated by removal of water. Other metal salts may be formed similarly.

Both the free acids and the corresponding salts of this invention are highly colored compounds which are useful as antihalation dyes. When exposed to water containing an excess of a base, i.e., at pH above 8, and particularly above pH 9, they are hydrolyzed to colorless products which do not revert to the original colored products when acidified.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. 4 - (1,2 - dicyanovinyl)aryldicyanomethanes having the formula

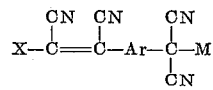

wherein Ar is selected from the group consisting of
1,4-phenylene,
1,4-naphthylene,
1,4-anthrylene, and
9,10-anthrylene;

X is a monovalent radical selected from the group consisting of

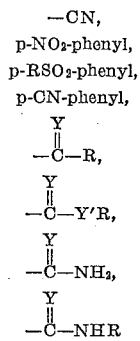

wherein Y and Y' are chalcogens of atomic number of up to 17, and R is hydrocarbyl of from 1 to 20 carbon atoms free of aliphatic carbon-to-carbon unsaturation; and M is selected from the group consisting of hydrogen, ammonium, sulfonium and metallic cations.

2. Tetramethylammonium (4-tricyanovinylphenyl)dicyanomethanide.

3. 4-(1,2-dicyano - 2 - [p-nitrophenyl]-vinyl)phenyldicyanomethane.

4. 4-(1,2-dicyano - 2 - ethoxycarbonylvinyl)phenyldicyanomethane.

5. Sodium (4-tricyanovinylphenyl)dicyanomethanide.

6. Process for the preparation of 4-(1,2-dicyanovinyl)-phenyldicyanomethanes which comprises contacting and reacting in a medium having a pH greater than 7, at a temperature in the range of about 0° to about 160° C. and in the substantial absence of water, 1,4-bis(dicyanomethylene)cyclohexadiene, which has the formula

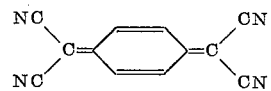

with a substituted acetonitrile, having the formula

X—CH₂—CN where X is a monovalent radical selected from the group consisting of

—CN,
p-NO₂-phenyl,
p-ROS₂-phenyl,
p-CN-phenyl,

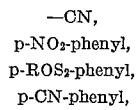

and

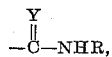

wherein Y and Y' are chalcogens of atomic number of up to 17, and R is hydrocarbyl of from 1 to 20 carbon atoms free of aliphatic carbon-to-carbon unsaturation.

7. Process for the preparation of 4-(1,2-dicyanovinyl)-phenyldicyanomethanes which comprises contacting and reacting in a medium having a pH greater than 7, at a temperature in the range of about 0° to about 160° C. and in the substantial absence of water, 1,4-bis(dicyanomethylene)cyclohexadiene which has the formula
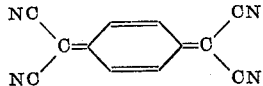
with a substituted acetonitrile having the formula
$$X-CH_2CN$$
where X is —CN.
References Cited in the file of this patent
UNITED STATES PATENTS
2,762,832    Heckert _____ Sept. 11, 1956
2,889,335    Heckert _____ June 2, 1959